United States Patent
Yoshida

(10) Patent No.: US 7,805,923 B2
(45) Date of Patent: Oct. 5, 2010

(54) INTEGRATED COAL GASIFICATION COMBINED CYCLE PLANT

(75) Inventor: Naoshige Yoshida, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 958 days.

(21) Appl. No.: 11/637,137

(22) Filed: Dec. 12, 2006

(65) Prior Publication Data

US 2008/0134658 A1    Jun. 12, 2008

(51) Int. Cl.
*F02C 3/26* (2006.01)

(52) U.S. Cl. .................. 60/39.464; 60/39.182; 60/781; 60/39.12

(58) Field of Classification Search ............... 60/39.12, 60/781, 39.182, 801, 772, 39.464, 39.5, 39.511
See application file for complete search history.

(56) References Cited

U.S. PATENT DOCUMENTS

| | | | | |
|---|---|---|---|---|
| 3,849,662 | A * | 11/1974 | Blaskowski et al. | 290/2 |
| 4,212,160 | A * | 7/1980 | Blaskowski | 60/39.12 |
| 5,174,107 | A | 12/1992 | Ogawa et al. | |
| 5,265,410 | A * | 11/1993 | Hisatome | 60/39.12 |
| 5,313,913 | A * | 5/1994 | Ohshita et al. | 122/4 D |
| 5,440,873 | A * | 8/1995 | Toda et al. | 60/39.12 |
| 5,509,264 | A | 4/1996 | Ito et al. | |
| 5,517,815 | A * | 5/1996 | Fujioka et al. | 60/39.12 |
| 5,673,634 | A * | 10/1997 | Karger et al. | 110/234 |
| 5,704,206 | A * | 1/1998 | Kaneko et al. | 60/39.12 |
| 5,765,365 | A * | 6/1998 | Fujioka et al. | 60/39.12 |
| 5,988,080 | A * | 11/1999 | Miyoshi et al. | 110/343 |
| 6,032,456 | A * | 3/2000 | Easom et al. | 60/793 |
| 6,598,399 | B2 * | 7/2003 | Liebig | 60/772 |
| 6,872,373 | B2 * | 3/2005 | Tatsuhara et al. | 423/244.03 |
| 7,029,639 | B2 * | 4/2006 | Yasutake et al. | 423/244.09 |
| 2006/0178263 | A1 * | 8/2006 | Tatsuhara et al. | 502/417 |
| 2007/0137169 | A1 * | 6/2007 | Ishigami et al. | 60/39.12 |
| 2008/0141646 | A1 * | 6/2008 | Yoshida | 60/39.12 |

(Continued)

FOREIGN PATENT DOCUMENTS

JP    3-43608 A    2/1991

(Continued)

OTHER PUBLICATIONS

Japanese Office Action dated Oct. 20, 2008, issued in corresponding Japanese Patent Application No. 2004-188887.

*Primary Examiner*—William H Rodriguez
(74) *Attorney, Agent, or Firm*—Westerman, Hattori, Daniels & Adrian, LLP

(57) ABSTRACT

An integrated coal gasification combined cycle (IGCC) plant which appropriately processes an early produced gas to suppress the emission of a sulfur component into the atmosphere for further improving environmental compatibility is provided. The IGCC plant has a gasifier for converting pulverized coal to gas fuel, a gas turbine operated thereby and supplying a combustion exhaust gas to an heat recovery steam generator, a steam turbine operated by steam generated thereby, and a power generator connected to the gas turbine system and/or the steam turbine. In this IGCC plant, a combustion exhaust gas discharged from the heat recovery steam generator is desulfurized and exhausted into the atmosphere. In addition, an initial desulfurization equipment exclusively used for the early produced gas is provided for a flow path extending from an outlet side of the gasifier to a flare system.

3 Claims, 3 Drawing Sheets

U.S. PATENT DOCUMENTS

2008/0141647 A1* 6/2008 Yoshida ............... 60/39.12
2009/0151315 A1* 6/2009 Kamohara et al. ......... 60/39.24

FOREIGN PATENT DOCUMENTS

| JP | 7-4260 A | 1/1995 |
| JP | 9-268904 A | 10/1997 |
| JP | 11-30131 A | 2/1999 |
| JP | 2006-10226 A | 1/2006 |

* cited by examiner

INTEGRATED COAL GASIFICATION COMBINED CYCLE PLANT

BACKGROUND OF THE INVENTION

1. Field of the Invention

The present invention relates to an integrated coal gasification combined cycle plant for combined power generation using coal as fuel, and more particularly, relates to gas processing at a startup stage in a flue-gas-desulfurization-type integrated coal gasification combined cycle plant.

This application is based on Japanese Patent Application No. 2004-188887, the content of which is incorporated herein by reference.

2. Description of Related Art

Heretofore, an integrated coal gasification combined cycle (hereinafter referred as "IGCC") plant has been known. In this IGCC plant, a produced gas obtained through gasification at an early stage (hereinafter referred to as an "early produced gas") when the operation of the IGCC plant is started does not satisfy the conditions for use as fuel for a gas turbine due to, among other factors, the low calorific content, and hence the early produced gas must be processed in a gas processing system such as a flare system before it is supplied to the gas turbine. The processing of the early produced gas is called startup gas processing.

In a flue-gas-desulfurization-type IGCC plant, since an early produced gas processed by a flare system or the like does not pass through a gas clean-up system, the gas contains a large amount of a sulfur component. Accordingly, when the early produced gas is directly processed by a flare system, although it takes a relatively short period of time (approximately 2 to 3 hours in general), a relatively high concentration of the sulfur component is emitted into the atmosphere, which is undesirable.

When an early produced gas which satisfies predetermined conditions starts to be supplied as a fuel gas to a gas turbine, exhaust gas from the gas turbine is made to pass through a flue gas desulfurization (FGD) equipment which performs desulfurization and is then exhausted into the atmosphere, thereby causing no environmental problems at all.

One technique in the related art for processing the above-described early produced gas is, for example, to use a system in which the early produced gas is received in a $H_2S$ combustion furnace and is then removed in a wet-type desulfurization tower used for an off-gas. In this case, the waste heat is recovered as re-boiler steam (for example, see Japanese Unexamined Patent Application Publication No. 9-268904).

The flue-gas-desulfurization-type IGCC plant described above suffers from the problem that, since the sulfur component contained in the early produced gas, which is produced by gasification at an early stage of the plant startup, is processed without any pretreatment, the sulfur component is emitted into the atmosphere. Hence, in consideration of recent environmental concerns, there have been demands to solve the atmospheric emission problem of the sulfur component using appropriate gas processing, even though the emission lasts for a short period of time at the startup stage, and to improve the environmental compatibility of IGCC plants at a low cost.

In the structure disclosed in the above Japanese Unexamined Patent Application Publication No. 9-268904, there has been a problem in that the volume of the off-gas wet-type desulfurization tower is increased, although it was originally small.

BRIEF SUMMARY OF THE INVENTION

Accordingly, the present invention has been conceived in consideration of the above situation, and an object of the present invention is to provide an integrated coal gasification combined cycle plant which appropriately processes an early produced gas produced at the startup stage so as to suppress the emission of a sulfur component into the atmosphere and which further improves environmental compatibility.

To this end, in accordance with a first aspect of the present invention, there is provided a flue-gas-desulfurization-type integrated coal gasification combined cycle plant comprising: a gasifier configured to convert pulverized coal to a syngas; a heat recovery steam generator configured to generate steam; a gas turbine which is operated by the syngas and which supplies exhaust gas to the heat recovery steam generator; a steam turbine which is operated by the steam generated by the heat recovery steam generator; a generator connected to the end of the gas turbine and/or the steam turbine; a desulfurization equipment configured to clean up the exhaust gas discharged from the heat recovery steam generator, the desulfurized exhaust gas being exhausted into the atmosphere; a flow path which is provided for an early produced gas and which is branched from an outlet side of the gasifier and is extended to the flare system; and an exclusive desulfurization equipment which is provided in the flow path and which is used for the early produced gas.

According to the integrated coal gasification combined cycle plant described above, since the desulfurization equipment exclusively used for the early produced gas is provided for the flow path therefor which is branched from the outlet side of the gasifier and is extended to the flare system, the sulfur component can be removed by this desulfurization equipment, which has a small capacity and which can be constructed at a low cost. In this case, the capacity of the desulfurization equipment exclusively used for the early produced gas can be decreased to 50 percent or less as compared to that required for desulfurization of the exhaust gas discharged from the heat recovery steam generator, and for a short processing time, the capacity can be preferably decreased to 20 to 10 percent or less.

In accordance with a second aspect of the present invention, there is provided a flue-gas-desulfurization-type integrated coal gasification combined cycle plant comprising: a gasifier configured to convert pulverized coal to a syngas; an heat recovery steam generator configured to generate steam; a gas turbine which is operated by the syngas and which supplies a exhaust gas to the heat recovery steam generator; a steam turbine which is operated by the steam generated by the heat recovery steam generator; a generator connected to the end of the gas turbine and/or the steam turbine; a desulfurization equipment configured to desulfurize the exhaust gas discharged from the heat recovery steam generator, the desulfurized exhaust gas being exhausted into the atmosphere; a flow path for an early produced gas which is branched from an outlet side of the gasifier; and a gas processing furnace provided to the flow path so that a exhaust gas from the gas processing furnace is supplied to the desulfurization equipment.

According to the integrated coal gasification combined cycle plant described above, since the gas processing furnace is provided to the flow path for the early produced gas which is branched from the outlet side of the gasifier, and the exhaust gas from the gas processing furnace is fed to the desulfurization equipment, the exhaust gas of the gas processing furnace obtained by combustion of the early produced gas containing a sulfur component is removed by the desulfurization equipment provided beforehand in order to desulfurize the exhaust gas discharged from the heat recovery steam generator. Hence, it is not necessary to provide an additional desulfurization equipment exclusively used for the early produced gas.

In accordance with a third aspect of the present invention, there is provided a flue-gas-desulfurization-type integrated coal gasification combined cycle plant comprising: a gasifier configured to convert pulverized coal to a syngas; a heat recovery steam generator configured to generate steam; a gas turbine which is operated by the syngas and which supplies an exhaust gas to the heat recovery steam generator; a steam turbine which is operated by the steam generated by the heat recovery steam generator; a generator connected to the end of the gas turbine and/or the steam turbine; a desulfurization equipment configured to desulfurize the exhaust gas discharged from the heat recovery steam generator, the desulfurized exhaust gas being exhausted into the atmosphere; a flow path for an early produced gas which is branched from an outlet side of the gasifier and is connected to an inlet of the heat recovery steam generator; and a burner provided for an inlet portion of the heat recovery steam generator for processing the early produced gas by combustion.

According to the integrated coal gasification combined cycle plant described above, since the flow path for the early produced gas which is branched from the outlet side of the gasifier is connected to the inlet of the heat recovery steam generator, and the early produced gas is burned by the burner provided at the inlet portion of the heat recovery steam generator, the exhaust gas generated by the combustion of the early produced gas is exhausted into the atmosphere after the sulfur component of the exhaust gas is removed by the desulfurization equipment provided beforehand. Hence, it is not necessary to provide an additional gas cooling equipment and a desulfurization equipment exclusively used for the early produced gas.

According to the integrated coal gasification combined cycle plant of the present invention, the early produced gas which is obtained by gasification at the startup stage of the plant is processed as described below.

(1) The early produced gas is desulfurized by an exclusive desulfurization equipment with a small capacity and is then processed by the flare system, followed by emission into the atmosphere.

(2) The early produced gas is burned in the gas processing furnace to produce a exhaust gas, and this exhaust gas is made to pass through the desulfurization equipment for the exhaust gas of the gas turbine system for desulfurization, followed by emission into the atmosphere; or (3) The early produced gas is processed by the duct burner provided at the inlet of the heat recovery steam generator and is then desulfurized while being made to pass through the desulfurization equipment for the exhaust gas from the gas turbine for desulfurization, followed by emission into the atmosphere.

Accordingly, the early produced gas containing the sulfur component can be emitted into the atmosphere after being desulfurized at a low cost, and as a result, it is possible to significantly improve the environmental compatibility.

DESCRIPTION OF THE PREFERRED EMBODIMENTS

Hereinafter, one embodiment of an integrated coal gasification combined cycle plant according to the present invention will be described with reference to the drawings.

Figure 1:
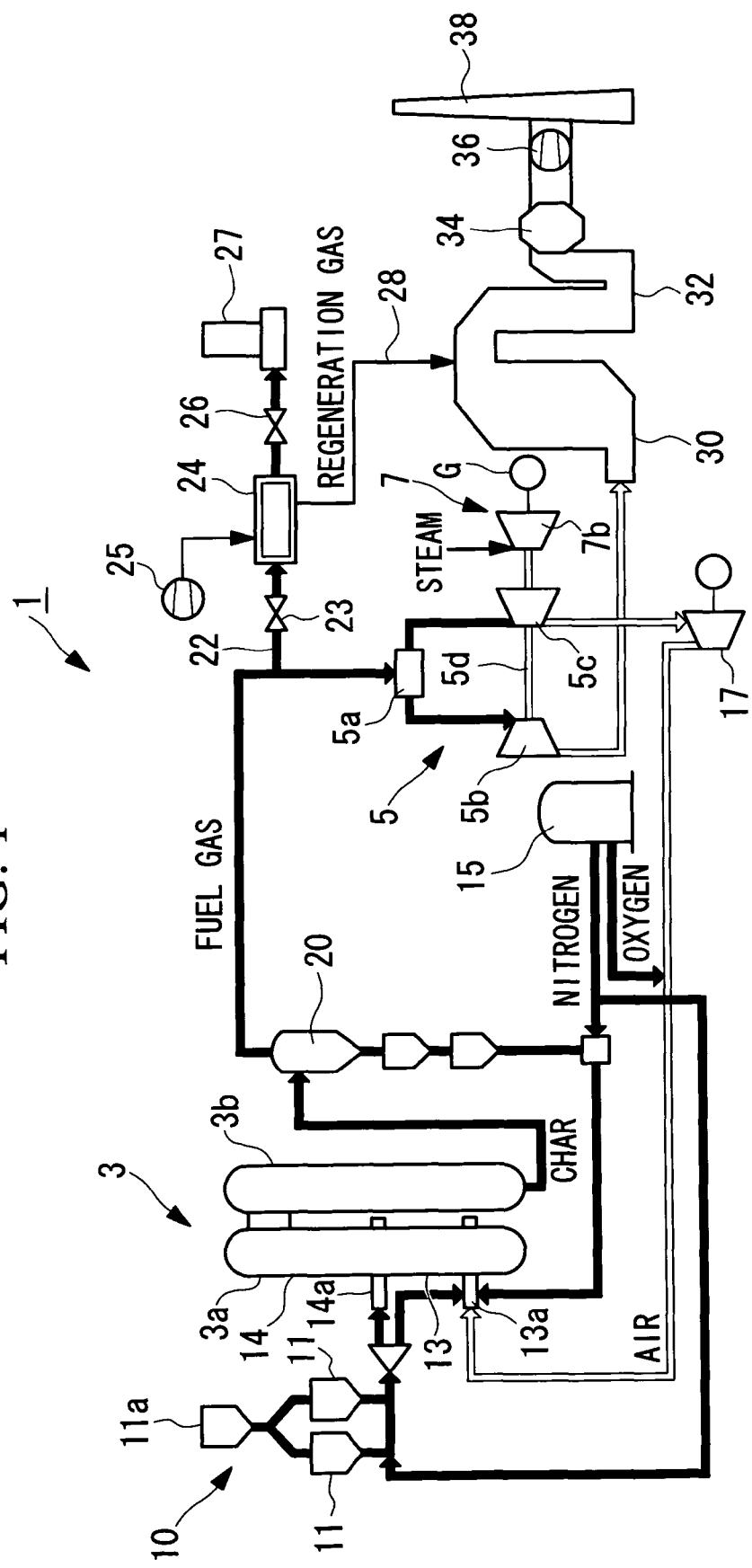
FIG. 1 is a schematic diagram of a first embodiment of an integrated coal gasification combined cycle plant according to the present invention.

As a first embodiment shown in FIG. 1, an integrated coal gasification combined cycle (hereinafter referred to as "IGCC") plant 1 using coal as fuel primarily includes a gasifier 3, a gas turbine 5, and a steam turbine 7.

A coal supply system 10 for supplying pulverized coal to the gasifier 3 is provided at an upstream side thereof. This coal supply system 10 has a pulverizer (not shown) which pulverizes raw coal into fine powdered coal having a particle size of several to several hundreds of micrometers and is designed so that the pulverized coal is stored in a pulverized coal bin 11a.

The pulverized coal stored in the bin 11a is fed into the pulverized coal supply hoppers 11, and pressurized by high-pressure nitrogen gas which is supplied by the air separation unit 15. Pressurized coal is fed at a constant flow rate to the gasifier 3 together with nitrogen gas.

The gasifier 3 has a coal gasification section 3a formed so that a gas flows from the lower side to the upper side and a heat exchange section 3b which is connected to the downstream side of the coal gasification section 3a and which is formed so that a gas flows from the upper side to the lower side.

In the coal gasification section 3a, a combustor 13 and a reductor 14 are provided in that order from the lower side. The combustor 13 is a portion in which the pulverized coal and char are partially burned, and the rest is pyrolyzed into volatile components ($CO$, $H_2$, and lower hydrocarbons). In the combustor 13, an entrained bed is used. However, a fluidized bed or a fixed bed may also be used.

The combustor 13 and the reductor 14 are provided with a combustor burner 13a and a reductor burner 14a, respectively, and the pulverized coal is supplied thereto from the coal supply system 10.

The combustor burner 13a is formed so that air from an air booster 17 is supplied thereto together with oxygen separated in the air separation unit 15. As described above, the configuration is designed so that air containing oxygen at a controlled concentration is supplied to the combustor burner 13a.

In the reductor 14, the pulverized coal is gasified by a high-temperature combustion gas supplied from the combustor 13. Consequently, flammable gases such as $CO$ and $H_2$ are produced from the coal. The coal gasification reaction is an endothermic reaction in which carbon atoms in the pulverized coal and char are made to react with $CO_2$ and $H_2O$ in a high-temperature gas to form $CO$ and $H_2$.

In the heat exchange section 3b of the gasifier 3, a plurality of heat exchangers is provided and is designed to generate steam using the sensible heat obtained from the gas fed from the reductor 14. The steam generated in the heat exchangers is primarily used to drive a steam turbine 7b.

The gas passing through the heat exchange section 3b is fed to a char recovery equipment 20. This char recovery equipment 20 has porous filters, and when the gas is made to pass therethrough, char contained in the gas is trapped and recovered. The char thus recovered is returned to the combustor burner 13a of the gasifier 3, together with the nitrogen gas separated by the air separation unit 15, for recycling.

The gas passing through the char recovery equipment 20 is then supplied as a fuel gas to a combustor 5a of the gas turbine 5.

A branching path 22 guiding the produced gas from an outlet side of the gasifier 3 to a flare system 27 is provided between the char recovery equipment 20 and the combustor 5a of the gas turbine 5. At the downstream side of this branching path 22, an initial desulfurization equipment 24 is provided to clean up a syngas, which is formed by the gasifier 3, via a valve 23 which is opened at the early stage of the IGCC plant 1 starting up. The early produced gas does not satisfy the conditions for use as fuel for the gas turbine 5 due to, among other factors, the low calorific content, and hence it is necessary that the early produced gas be processed by a gas processing equipment such as a flare system 27 without being supplied to the combustor 5a.

The initial desulfurization equipment 24 is of a fixed bed type with a small volume and has an air induction fan 25 for catalyst regeneration. The small volume described in this case indicates the capacity of the equipment that can be operated for a certain time until the early produced gas becomes usable as fuel for the gas turbine 5. In general, the initial desulfurization equipment 24 may be designed to be operated for approximately 2 to 3 hours.

In a common desulfurization system, a plurality of equipments each having a 100 percent processing capacity are provided to achieve a long-term operation (for example, three equipments are generally prepared) and are used in rotation, and for the equipments which are used for a predetermined time, the catalysts thereof must be regenerated. However, the above initial desulfurization equipment 24 is only used for a limited short period of time, and after normal operation is started, that is, once the produced gas becomes usable as fuel for the gas turbine system 5, a sufficient time for regenerating the catalyst can be easily ensured.

Accordingly, it is not necessary to prepare a plurality of desulfurization equipments having a 100 percent capacity; with this change in configuration, the process capacity can be significantly decreased (for example, when the number of equipments is decreased from three to one, the capacity can be decreased to one third). Furthermore, since the decrease in capacity can also be achieved with a short operation (processing) time, the processing capacity may be approximately decreased to 50% or less of that of a flue gas desulfurization equipment 32 provided downstream of a heat recovery steam generator 30, which will be described later.

In addition, since the flow rate of the early produced gas is approximately 60% of that of the gas produced in the normal operation, the processing capacity of the initial desulfurization equipment 24 is preferably decreased to 20% or less of the desulfurization equipment 32 and is more preferably decreased to 10% ($\frac{1}{3} \times \frac{1}{2} \times 0.6 = 0.1$) or less. By decreasing the processing capacity, cost reduction and size reduction can be achieved.

At the downstream side of the initial desulfurization equipment 24, the flare system 27 is provided with a valve 26 interposed therebetween. The flare system 27 is a system in which the early produced gas desulfurized by the initial desulfurization equipment 24 is processed by combustion.

In addition, reference numeral 28 in the figure indicates a regeneration gas line which is a flow path for feeding a regenerated gas ($SO_2$) to an inlet of the flue gas desulfurization equipment 32 from the initial desulfurization equipment 24 in order to remove the sulfur component with the flue gas desulfurization equipment (FGD) 32.

The gas turbine 5 has the combustor 5a in which the syngas is burned, a gas turbine 5b driven by the combustion gas, and a turbo compressor 5c feeding high-pressure air to the combustor 5a. The gas turbine 5b and the turbo compressor 5c are connected to each other by a rotating shaft 5d. The air compressed by the turbo compressor 5c is to be supplied to the air booster 17 in addition to the combustor 5a.

A gas-turbine exhaust gas is supplied to the heat recovery steam generator (hereinafter referred to as an "HRSG" in some cases) 30.

The steam turbine 7b is connected to the same shaft 5d as that of the gas turbine 5, so that a so-called single-shaft combined system is formed. High-pressure steam is supplied to the steam turbine 7b from the gasifier 3 and the HRSG 30. In addition to the single-shaft combined system, a multi-shaft combined system may also be used.

A power generator G which outputs electricity from the rotating shaft 5d driven by the gas turbine 5b and the steam turbine 7b is provided at one side of the steam turbine system 7 opposite to that of the gas turbine system 5. However, the position of the power generator G is not limited to that described above, and the power generator G may be disposed at any position so long as an electrical output can be obtained from the rotating shaft 5d.

The HRSG 30 generates steam by the combustion exhaust gas from the gas turbine 5b, and the flue gas desulfurization equipment 32 is provided downstream of the combustion exhaust gas flow of the HRSG 30. This desulfurization equipment 32 is formed so that the sulfur component in the exhaust gas is removed.

The gas passing through the desulfurization equipment 32 is made to pass through a wet-type electric precipitator (wet-EP) 34 and an induction fan (BUF) 36 and is then exhausted into the atmosphere via a stack 38.

Next, the operation of the IGCC plant 1 having the above structure will be described.

Raw coal is pulverized by a pulverizer (not shown) and is then fed to the bin 11a for storage. The pulverized coal stored in the bin 11a is fed into the pulverized coal supply hoppers 11, and then, supplied to the reductor burner 14a and the combustor burner 13a together with nitrogen separated by the air separation unit 15. Furthermore, in addition to the pulverized coal, the char recovered by the char recovery equipment 20 is also supplied to the gasifier combustor 13.

As combustion air for the combustor burner 13a, air which is prepared by adding oxygen separated by the air separation unit 15 to compressed air which is obtained by further increasing the pressure of compressed air extracted from the turbo compressor 5c using the air booster 17 is used. In the combustor 13, the pulverized coal and the char are partially burned with the combustion air, and the rest is pyrolyzed to generate volatile components (CO, $H_2$, and lower hydrocarbons).

In the reductor 14, the pulverized coal supplied via the reductor burner 14a and the char from which the volatile components are discharged in the combustor 13 are gasified by a high-temperature gas rising from the combustor 13 to produce flammable gases such as CO and $H_2$.

The gases passing through the reductor 14 transfer their sensible heat to the heat exchangers while passing through the heat exchange section 3b of the gasifier 3, so that steam is generated. The steam generated in the heat exchange section 3b is primarily used to drive the steam turbine 7b.

The gases passing through the heat exchange section 3b are fed to the char recovery equipment 20, so that char is recovered. The char thus recovered is returned to the gasifier 3.

The gases passing through the char recovery equipment 20 are fed to the combustor 5a of the gas turbine 5 and are then burned together with the compressed air supplied from the turbo compressor 5c. The gas turbine 5b is rotated by this combustion gas, and the rotating shaft 5d is driven.

When the gasifier 3 is started, it is not possible to obtain a gas which has a calorific value suitable for use as fuel supplied to the combustor 5a of the gas turbine system 5; hence, by opening the valves 23 and 26, the early produced gas is fed to the initial desulfurization equipment 24 for desulfurization and is then fed to the flare system 27 so as to be processed by combustion. Accordingly, even if the early produced gas containing a sulfur component, which cannot be used as fuel for the gas turbine system 5, is produced when the IGCC plant 1 is started, since the early produced gas is desulfurized by the initial desulfurization equipment 24, followed by the combustion process, the sulfur component is not emitted into the air, and as a result, the environmental compatibility is further improved.

In addition, when the gasifier 3 is ready to supply a produced gas that is usable as fuel for the gas turbine 5, while the catalyst of the initial desulfurization equipment 24 is isolated by closing the valves 23 and 26 (blocking the two flow paths), the air forced fan 25 is operated to supply air to the catalyst for regeneration thereof. The regenerated gas ($SO_2$) thus produced by this catalyst reactivation is fed to the inlet of the flue gas desulfurization equipment 32, and the sulfur component is removed thereby.

The combustion exhaust gas passing through the gas turbine 5b is fed to the HRSG 30, and by using the sensible heat of this combustion exhaust gas, steam is generated. The steam generated in the HRSG 30 is primarily used to drive the steam turbine 7b.

The steam turbine 7b is rotated by the steam from the gasifier 3 and the steam from the HRSG 30 to drive the rotating shaft 5d of the gas turbine system 5. The torque of the rotating shaft 5d is converted to an electrical output by the power generator G.

The combustion exhaust gas passing through the HRSG 30 is fed to the desulfurization equipment 32, and the sulfur component is removed thereby. Subsequently, the combustion exhaust gas sucked by the induction fan 36 is made to pass through the wet-type electric precipitator 34 so as to remove dust and sulfuric acid mist in the combustion exhaust gas and is then emitted into the atmosphere via the stack 38.

Figure 2:
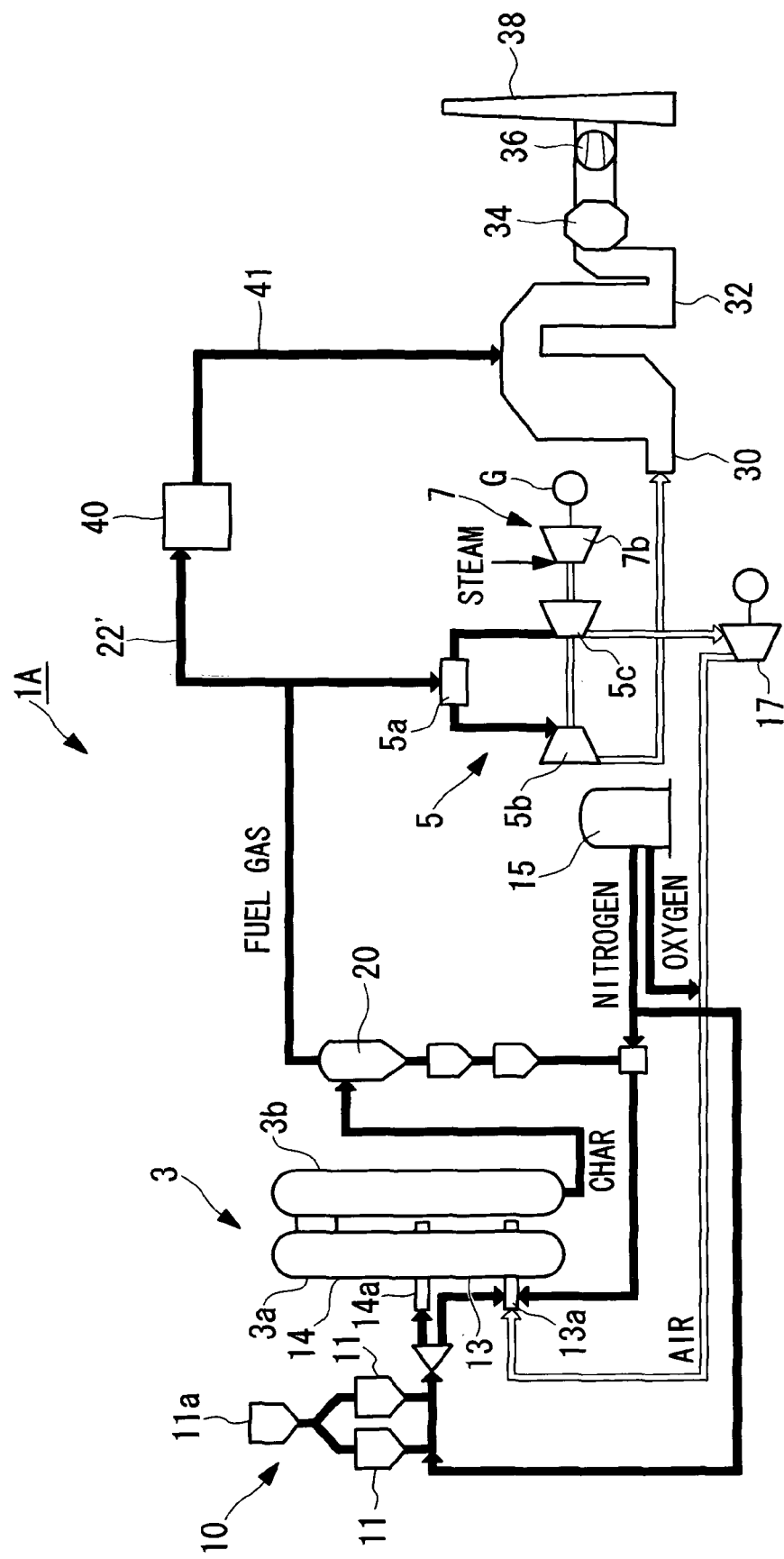
FIG. 2 is a schematic diagram of a second embodiment of an integrated coal gasification combined cycle plant according to the present invention.
Figure 3:
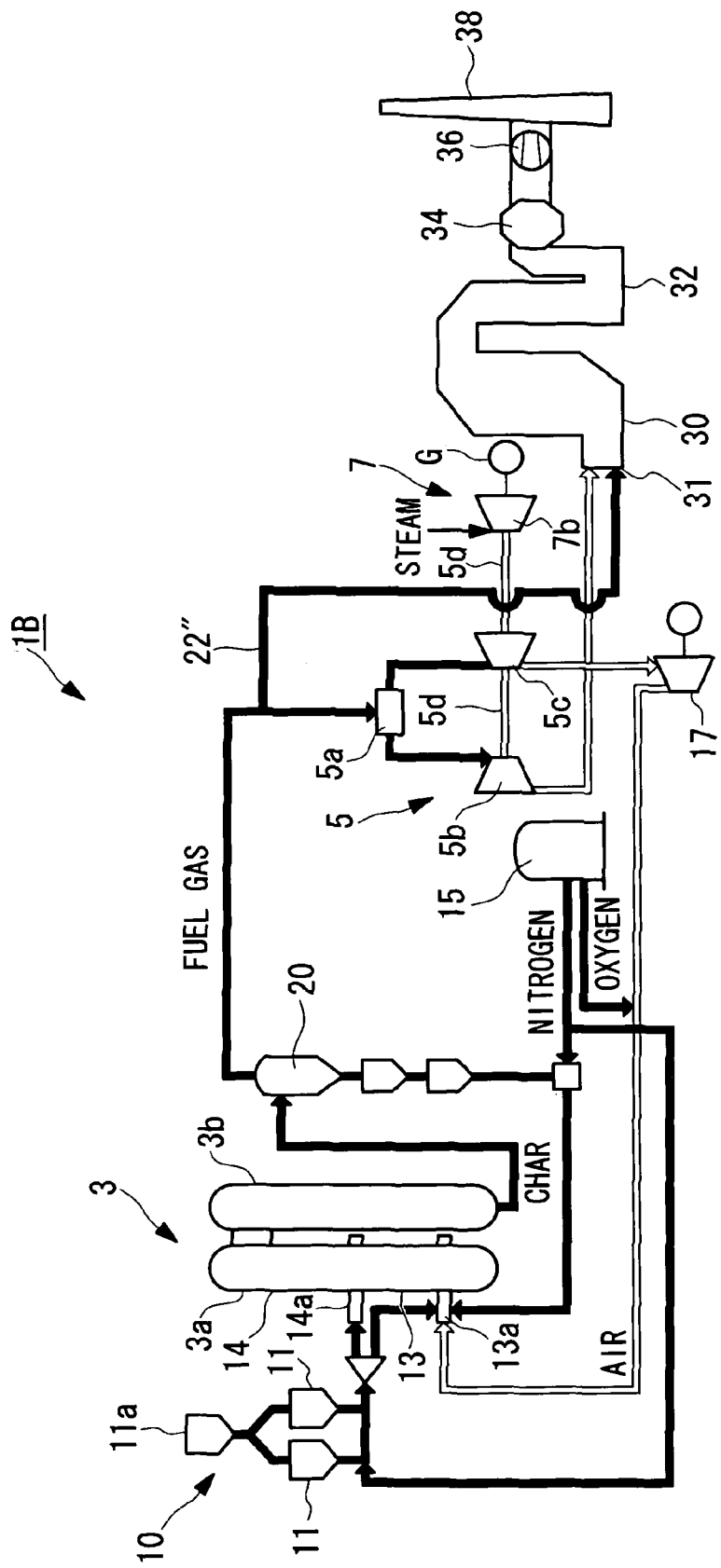
FIG. 3 is a schematic diagram of a third embodiment of an integrated coal gasification combined cycle plant according to the present invention.

Next, a second embodiment of the present invention will be described with reference to FIG. 2. The same reference numerals as in the first embodiment designate the same constituent elements of this embodiment, and a description thereof will be omitted.

In this embodiment, in order to process the early produced gas, as an exhaust pipe for exhausting the early produced gas from the outlet side of the gasifier 3, a branching path 22' for the produced gas is provided between the char recovery equipment 20 and the combustor 5a of the gas turbine 5. For this branching path 22', an exclusive gas processing furnace 40 is provided which exclusively processes the early produced gas by combustion. After being appropriately cooled, the combustion exhaust gas generated in the gas processing furnace 40 is fed via a downstream-side exhaust gas line 41 to the desulfurization equipment 32 which is provided downstream of the HRSG 30 for the combustion exhaust gas of the gas turbine 5.

Since the sulfur component contained in the combustion exhaust gas is removed in the desulfurization equipment 32, combustion exhaust gas containing no sulfur component is emitted into the atmosphere. That is, even at the startup stage of the IGCC plant 1, since the combustion exhaust gas from which the sulfur component is removed can be emitted into the atmosphere, the environmental compatibility can be improved.

Finally, a third embodiment of the present invention will be described. In this embodiment, the same reference numerals as in the first and the second embodiments designate the same constituent elements, and a description thereof will be omitted.

In this embodiment, in order to process the early produced gas, as a pathway for guiding the early produced gas from the outlet side of the gasifier 3 to an inlet 31 of the HRSG 30, a branching path 22" for the produced gas is provided between the char recovery equipment 20 and the combustor 5a of the gas turbine system 5. At the inlet 31 of the HRSG 30, a duct burner (not shown) is provided, and the early produced gas is processed by combustion using this duct burner.

According to the structure described above, the combustion exhaust gas generated by the combustion of the early produced gas is exhausted into the atmosphere from the stack 38 after the sulfur component is removed by the desulfurization equipment 32, and hence the environmental compatibility can be improved.

In addition, since the early produced gas is burned at the inlet 31 of the HRSG 30 by the duct burner while the induction fan 36 is operated, at the startup stage of the IGCC plant 1, steam can be formed by the heat generated by this combustion, and hence this steam can be used to drive the gas turbine 5. That is, since an auxiliary boiler normally necessary for producing steam for driving the gas turbine 5 is not required, and the IGCC plant 1 can be manufactured at a lower cost.

The present invention is not limited to the above embodiments, and changes and modifications may be optionally made without departing from the scope and the sprit of the present invention.

What is claimed is:

1. A flue-gas-desulfurization-type integrated coal gasification combined cycle plant comprising:
   a gasifier configured to convert pulverized coal to a gas fuel;
   a heat recovery steam generator configured to generate steam;
   a gas turbine which is operated by the gas fuel and which supplies a combustion exhaust gas to the heat recovery steam generator;
   a steam turbine which is operated by the steam generated by the heat recovery steam generator;
   a power generator connected to at least one of the gas turbine and the steam turbine;
   a desulfurization equipment configured to desulfurize the combustion exhaust gas discharged from the heat recovery steam generator, the desulfurized combustion exhaust gas being exhausted into the atmosphere;
   a flare system;
   a flow path which is provided for an early produced gas and which is branched from an outlet side of the gasifier and is extended to the flare system; and
   an exclusive desulfurization equipment which is provided for the flow path and which is exclusively used for the early produced gas.

2. A flue-gas-desulfurization-type integrated coal gasification combined cycle plant comprising:
   a gasifier configured to convert pulverized coal to a gas fuel;
   a heat recovery steam generator configured to generate steam;

a gas turbine which is operated by the gas fuel and which supplies a combustion exhaust gas to the heat recovery steam generator;
a steam turbine which is operated by the steam generated by the heat recovery steam generator;
a power generator connected to at least one of the gas turbine and the steam turbine;
a desulfurization equipment configured to desulfurize the combustion exhaust gas discharged from the heat recovery steam generator, the desulfurized combustion exhaust gas being exhausted into the atmosphere;
a flow path for an early produced gas which is branched from an outlet side of the gasifier; and
a gas processing furnace provided for the flow path so that a combustion exhaust gas from the gas processing furnace is supplied to the desulfurization equipment for desulfurization.

3. A flue-gas-desulfurization-type integrated coal gasification combined cycle plant comprising:
a gasifier configured to convert pulverized coal to a gas fuel;
an heat recovery steam generator configured to generate steam;
a gas turbine which is operated by the gas fuel and which supplies a combustion exhaust gas to the heat recovery steam generator;
a steam turbine which is operated by the steam generated by the heat recovery steam generator;
a power generator connected to at least one of the gas turbine and the steam turbine;
a desulfurization equipment configured to desulfurize the combustion exhaust gas discharged from the heat recovery steam generator, the desulfurized combustion exhaust gas being exhausted into the atmosphere;
a flow path for an early produced gas which is branched from an outlet side of the gasifier and is connected to an inlet of the heat recovery steam generator; and
a burner provided for an inlet portion of the heat recovery steam generator for processing the early produced gas by combustion.

* * * * *